Jan. 8, 1952     O. R. ETHERIDGE     2,582,198
JET PASTING OF STARCH
Filed March 3, 1949     2 SHEETS—SHEET 1
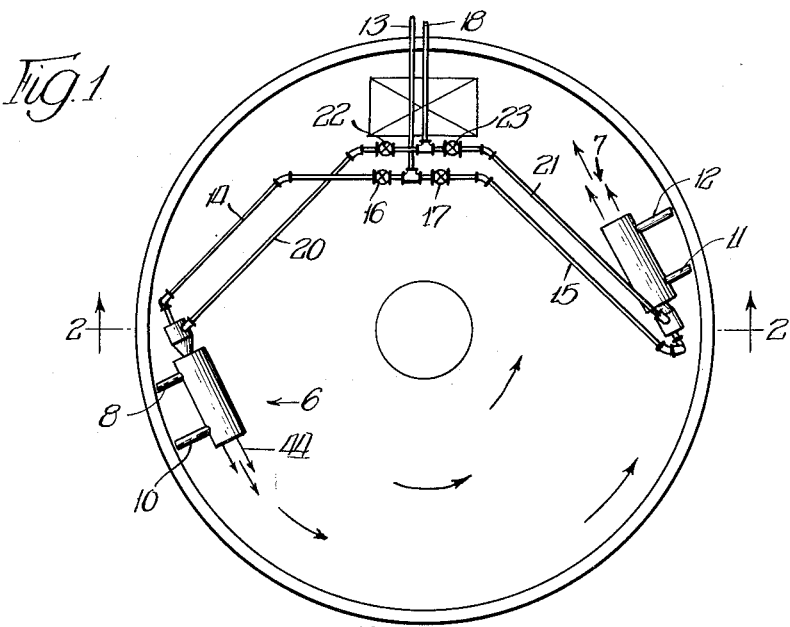
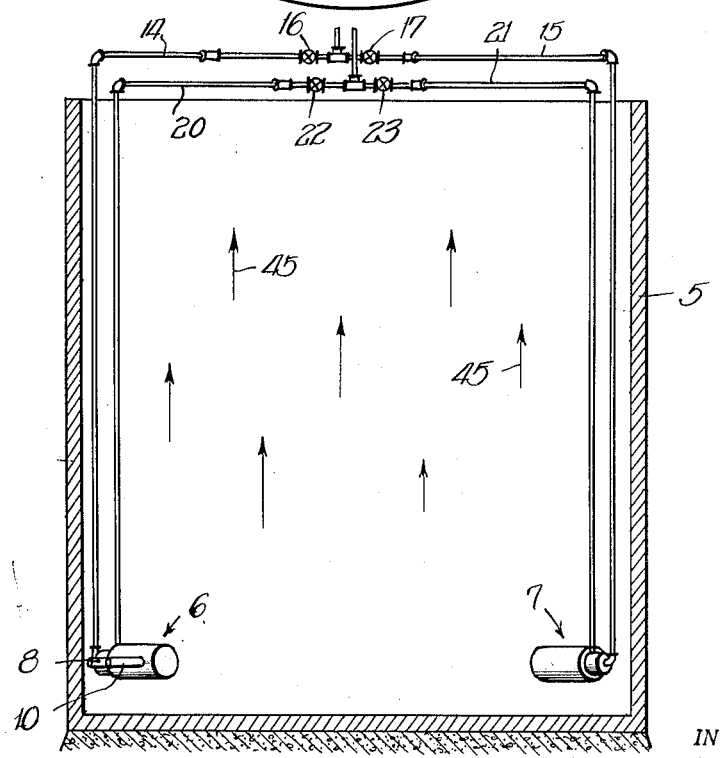
INVENTOR.
Oliver R. Etheridge,
BY Cromwell, Greist & Warden Jan. 8, 1952     O. R. ETHERIDGE     2,582,198
JET PASTING OF STARCH Filed March 3, 1949     2 SHEETS—SHEET 2

INVENTOR.
Oliver R. Etheridge,
BY
Cromwell, Greist & Warden
Attys

Patented Jan. 8, 1952

2,582,198

UNITED STATES PATENT OFFICE 2,582,198

JET PASTING OF STARCH

Oliver R. Etheridge, Decatur, Ill., assignor to A. E. Staley Manufacturing Company, Decatur, Ill., a corporation of Delaware Application March 3, 1949, Serial No. 79,463

8 Claims. (Cl. 127—28)

The present invention relates, generally, to new and useful improvements in apparatus for, and methods of, pasting starch. More specifically, the invention relates to new and improved apparatus for, and methods of, pasting starch wherein heated granules of unpasted or raw starch become dispersed in a body of pasted starch at elevated temperature before the starch granules become swollen to a substantial extent.

In many of the industrial uses to which starch is put, it is first necessary to paste the starch in water. The term "paste" designates the process of gelatinizing the starch in water at elevated temperature so as to swell and disrupt the starch granules thereby to produce a smooth paste or gel. Normally, the paste formation is accompanied by a marked increase in viscosity, producing a jelly-like consistency which is too thick and viscous to handle conveniently in normal pipe and pump systems. Furthermore, unless the pasting proceeds rather slowly, and with excellent agitation and blending, lumps of starch form, the interiors of which consist of unpasted starch. Considerable difficulty is involved in breaking up such lumps and satisfactorily dispersing them throughout the aqueous medium.

One of the more important applications of the present invention is in connection with the pasting of the large quantities of raw starch, preparatory to acid convension thereof in the production of corn syrup and dextrose. The invention has general application in connection with other processes wherein pasted starch is subjected to conversion or modification treatments, such as treatment with alkali, enzymes, etc. It will also be apparent that the invention has important applications in connection with the pasting of large quantities of starch which is then used without further modification, for example, as an adhesive, or in connection with sizing and coating operations.

It was found, according to the present invention, that the usual difficulties in connection with pasting of raw starch could be overcome if the individual granules could be separated from each other, and dispersed in a relatively thin medium, before the granules swelled to a substantial degree, that is, before appreciable gelling could take place. Apparently, when the individual granules swell in dispersed relationship one from another, the gelling is not localized and does not unduly thicken or increase the viscosity of the medium. The increase in viscosity is much less than normally encountered in prior pasting operations.

The object of the present invention, stated generally, is the provision of new and useful apparatus for, and method of, pasting large quantities of raw or unpasted starch wherein a steam jet serves to disperse the granules of an incoming supply of unpasted starch into a body of pasted starch, before the individual granules become substantially swollen, and the steam jet also serves to provide the heat for pasting the starch as well as provide the kinetic energy for agitating the body of pasted starch.

An important object of the invention is the provision of a unit for jet pasting starch which is adapted to be mounted in a relatively large capacity container, preferably mounted in the lower portion of a cylindrical tank in a tangential position adjacent the side thereof, such jet pasting units serving efficiently to paste and blend a supply of raw starch into a body of pasted starch contained in the container, the steam jet of the unit serving not only to paste the starch by rapidly blending it in dispersed condition into the body of previously pasted starch, but also serving to circulate the paste starch in the lower portion of the container and deliver sufficient heat thereto to cause vertical convection currents sufficient uniformly to agitate the upper portions of the body of starch.

Certain other objects of the invention will in part be obvious, and will in part appear hereinafter.

For a more complete understanding of the nature and scope of the invention, reference may now be had to the following detailed description thereof taken in connection with the accompanying drawings, wherein:

Fig. 1 is a top plan view of an open tank type starch converter provided with a pair of jet pasting units made in accordance with the present invention;

Fig. 2 is a vertical sectional view taken on line 2—2 of Fig. 1, with the jet pasting units being shown in elevation;

Figure 3:
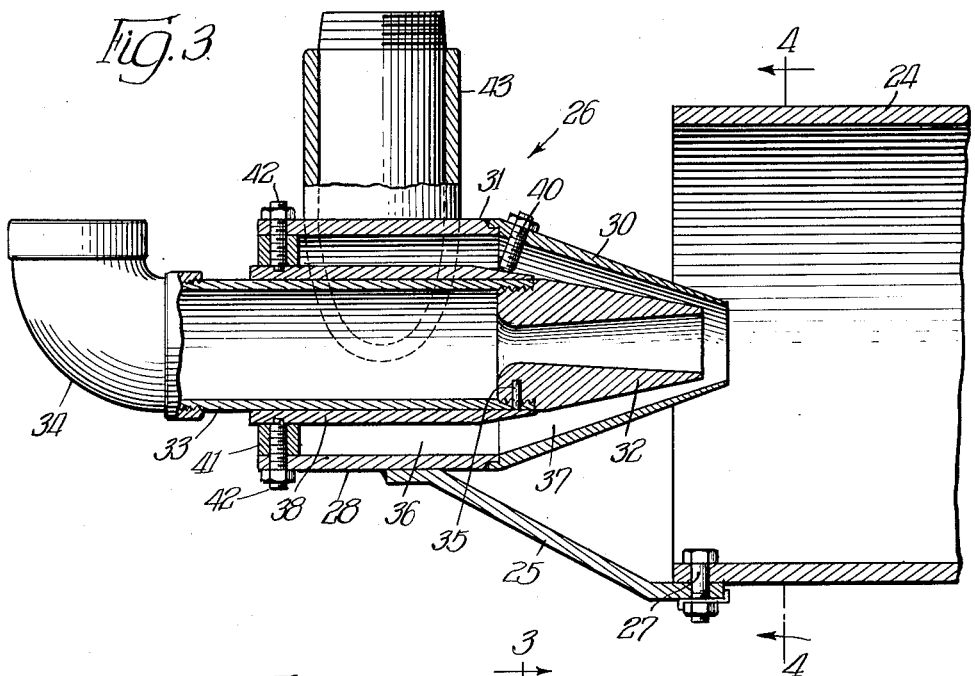
Fig. 3 is an enlarged, longitudinal sectional view through one of the jet pasting units shown in Fig. 1, the section being taken on line 3—3 of Fig. 4.

Referring to Figs. 1 and 2 of the drawings, the reference numeral 5 designates a cylindrical tank of an open converter for use in the acid-conversion of starch to corn syrup or dextrose. A pair of jet pasting units 6 and 7 are mounted in the bottom of the tank 5 in diametrically opposed relationship, with the axes of the units extending generally tangentially to the side wall of the tank. The unit 6 is mounted on the side wall of the tank 5 by a pair of brackets 8 and 10, and the unit 7 is likewise mounted by a pair of brackets 11 and 12. The units 6 and 7 are supplied with steam from a supply line 13 through the branch connections 14 and 15, respectively. The connections 14 and 15 are provided with control valves 16 and 17, respectively. Raw or unpasted starch slurry is supplied to the units 6 and 7 through a supply line 18 connected with the units through the branch connections 20 and 21, respectively, each of the branch connections 20 and 21 being provided with control valves 22 and 23, respectively.

Figure 4:
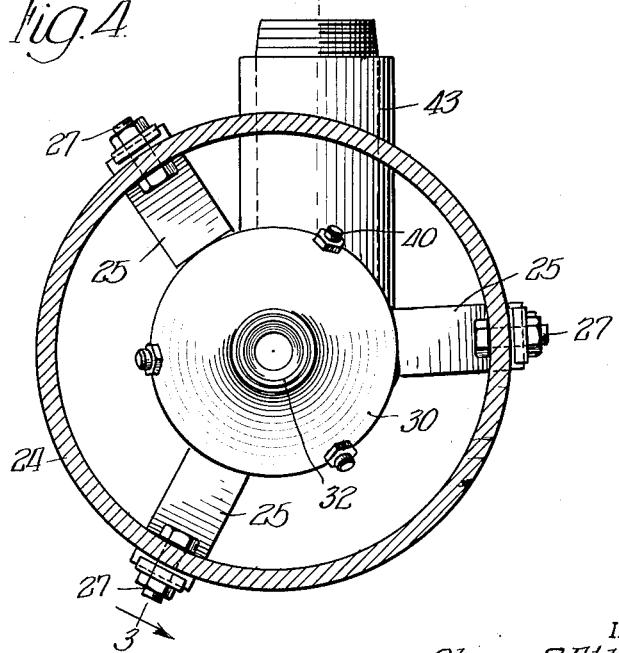
Fig. 4 is a sectional view taken on line 4—4 of Fig. 3.

For a detailed description of the jet pasting units 6 and 7, reference may now be had to Figs. 3 and 4 of the drawings.

Each of the jet pasting units includes a blending tube 24 in the form of a cylinder open at its opposite ends. In one embodiment of the invention which has been successfully operated, the blending tube 24 had an outside diameter of 8¾ inches and a length of 2 feet. It will, of course, be understood that these dimensions are not critical and that the jet pasting units may be made wherein the blending tubes have different diameters and lengths.

At one end of the blending tube 24, three equispaced brackets 25—25 serve to support, in coaxial alignment with the blending tube, a concentric nozzle unit indicated generally at 26. The brackets 25 may be secured to the sleeve 24 by bolts 27—27 and at the opposite ends the brackets may be welded to a cylindrical pipe section 28. The outer nozzle member 30 of the concentric nozzle unit 26 is joined and welded to one end of the section 28 as shown at 31. The inner nozzle member 32 is provided with threads at its supply end whereby it may be threaded into one end of a steam inlet pipe section 33. Steam may be introduced into the section 33 through an elbow 34 connected with the projecting end thereof, as shown. A pin 35 serves to secure the nozzle member 32 in fixed position. It will be noted that the throat of the inner nozzle member 32 is shaped so as to accelerate the flow of steam therethrough.

It will be seen that the cylindrical section 28 serves as a housing around the steam inlet section 33 so as to form an annular chamber 36 communicating with the tapered annular chamber 37 formed between the outside of the inner nozzle 32 in the interior or the outer nozzle 30. The outer nozzle 30 extends somewhat in front of the open end of the inner nozzle 32 for the purpose of bringing the slurry of raw starch flowing through the passage 37 into contact with the steam jet issuing from the inner nozzle 32.

In order to avoid pasting of starch within the unit 26 and to prevent the formation of a crust or hardened deposit of starch on the exterior of the section 33, which becomes heated by the steam introduced therethrough, a sleeve 38 of heat insulating material is provided which fits over the section 33 as shown. The forward end of the sleeve 38 is tapered so as to conform to the shape of the passage 37. Three equispaced set screws 40 serve to center the inner nozzle 32, steam inlet 33 and the sleeve 38 within the outer nozzle 30 of the housing 28. The rear end of the annular passage 36 is closed by means of a ring member 41 which is press-fitted into place and then secured by means of a plurality of set screws 42—42.

A starch slurry inlet connection 43 is welded to the housing 28 on the upper side thereof around an inlet opening therein.

In operation: the lower portion of the tank 5 is filled with water or pasted starch solution to a level somewhat above the tops of the units 6 and 7. The pasted starch solution for this purpose may be drawn off from another converter. Steam is then introduced from the line 13 through the branch connections 14 and 15 to each of the jet pasting units 6 and 7, respectively. The steam may suitably issue from the inner nozzles 32 of the units 6 and 7 at a velocity of approximately 2,000 feet per second at approximately atmospheric pressure. At the same time raw or unpasted starch slurry is supplied to the units 6 and 7 through the line 18 and branch connections 20 and 21 leading into the annular chambers 36 therein. Such starch slurry flows through the annular nozzle passages 37 and discharges therefrom into the steam jets issuing from the nozzles 32. As the starch granules merge with the steam they are immediately heated to gelatinization or pasting temperature.

The jet action of the steam jets serves to draw into each of the respective blending tubes 24 a stream or current of the body of pasted starch solution already in the tank 5. At the same time the granules of raw or unpasted starch, already heated by the steam jet, are uniformly dispersed and blended in the current or stream of pasted starch flowing through the blending tubes 24. The operation of the jet pasting units 6 and 7 is such that these individual granules of raw or unpasted starch are put into a dispersed condition before they have become swollen or gelatinized to a substantial extent. In this manner, the granules do not unduly increase the viscosity or thickness of the pasted starch, because of their dispersed or separated condition when they do become fully swollen and disrupted.

The streams of starch paste and steam issuing from the discharge ends of the jet pasting units 6 and 7, as indicated by the arrows 44 in Fig. 1, serve to set up a circulatory movement of pasted starch in the bottom part of the tank 5. At the same time, the heat introduced into the body of pasted starch by the steam jets of the units 6 and 7, being somewhat (i. e. a few per cent) in excess of the amount required for pasting alone, is sufficient to cause upward convection currents in the body of pasted starch in the upper portion of the tank 5 as indicated by the arrows 45—45 in Fig. 2, and produces boiling at the top surface of the pasted starch. This boiling action at the surface is accompanied by flashing of many small bubbles throughout the upper portion of the tank contents. These bubbles are so numerous and sufficiently small as to fluidize the starch paste, with the net result that the viscosity of the paste is much less than it would otherwise be in the absence of the bubbles, thereby permitting a high degree of circulation.

The rate of supply of the raw or unpasted starch into the tank 5 may be increased either by enlarging the size of the jet pasting units 6 and 7 or by providing additional jet pasting units. The jet pasting units make it possible to introduce the raw or unpasted starch into the tank at a high rate without producing a substantial increase in viscosity of the pasted starch therein.

It will be understood that the tank 5 may be provided with additional connections for introduction of acid to be used during conversion, steam for heating, and water. Also, provision may be made for emptying the tank 5, either through a suction pipe which may be disposed therein with its open end adjacent the bottom of the tank, or the contents of the tank may be discharged through an opening in the bottom thereof. It will also be understood that the jet pasting units 6 and 7 may be disposed in other forms of containers than the tank 5.

The jet pasting units 6 and 7 may be adapted for use in vessels wherein starch is pasted under superatmospheric pressure. Under such conditions, the raw starch slurry and the steam must be supplied at suitably increased pressures. The jet pasting units may be used in connection with continuous type converters.

It will be understood that other modifications may be made in the details of construction of the jet pasting units, and in the operation and application of the same, without departing from the spirit and scope of the present invention.

What is claimed as new is:

1. The continuous method of pasting starch which comprises discharging a low-pressure, high-velocity jet of steam into an open-ended sleeve submerged in a body of previously pasted starch thereby producing a flow stream of the pasted starch through said sleeve, and introducing an unpasted starch slurry into said jet adjacent its point of discharge, whereby the granules of unpasted starch become dispersed in said flow stream of pasted starch before swelling substantially.

2. The method called for in claim 1 wherein said steam jet discharges into said sleeve at approximately atmospharic pressure and at a velocity of approximately 2,000 feet per second.

3. The continuous method of pasting starch in a tank in the form of a vertical cylinder which comprises discharging a plurality of steam jets into a relatively large body of pasted starch in said tank, said jets being disposed adjacent the bottom of said tank adjacent the periphery and arranged to discharge in a generally tangential direction thereby to produce in the bottom of said tank a current flow of pasted starch circulating adjacent the periphery thereof, and introducing a slurry of unpasted starch into each of said jets adjacent its point of discharge whereby the granules of unpasted starch become dispersed in said body of pasted starch before substantial swelling thereof, the amount of steam introduced through said jets being in excess of that required for pasting and sufficient to produce boiling of said body of pasted starch at the top surface thereof.

4. Means for pasting starch adapted to be disposed in a container for pasted starch and comprising, in combination, a blending tube open at opposite ends, and a pair of interfitting concentric nozzles coaxially aligned with said blending tube with the discharge openings thereof disposed adjacent one end of said blending tube, in the operation of said means steam being supplied through the inner nozzle so as to provide a steam jet, unpasted starch slurry being supplied through the annular space between said nozzles and pasted starch being aspirated into the open blending tube at the end adjacent to said nozzles.

5. Means for pasting starch in a relatively large container, comprising in combination, a blending tube open at opposite ends, a pair of interfitting concentric nozzles coaxially aligned with said blending tube with the nozzle discharge openings thereof disposed immediately adjacent one end of said blending tube, said nozzle discharge openings having diameters substantially smaller than the internal diameter of said blending tube, a steam inlet pipe section attached to the inner nozzle, a housing forming an annular chamber around said pipe section and connected with the outer nozzle, said annular chamber providing an inlet chamber for introduction of unpasted starch slurry.

6. Means for pasting starch in a relative large container, comprising in combination, a blending tube open at opposite ends, a pair of interfitting concentric nozzles coaxially aligned with said blending tube with the nozzle discharge openings thereof disposed adjacent one end of said blending tube, a steam inlet pipe section attached in fluid transmitting relationship to the inner nozzle, a sheath of heat insulating material around said steam inlet pipe section, a starch inlet pipe section fitting over said steam inlet pipe section and connected in fluid transmitting relationship with the outer nozzle so as to form an annular chamber communicating with the annular nozzle chamber formed between said interfitting nozzles.

7. Means for pasting large amounts of starch, comprising in combination, a vertical tank and at least one jet pasting unit disposed in the bottom portion of said tank comprising a blending tube open at opposite ends, means for supporting said blending tube in a horizontal position adjacent the side wall of said tank with the longitudinal axis of said blending tube extending in a generally tangential direction with respect to said side wall, a pair of interfitting concentric nozzles coaxially aligned with said blending tube with the discharge openings thereof disposed adjacent one end of said tube, conduit inlet means for connecting the inner nozzle with a supply of steam, and conduit inlet means for connecting the outer nozzle with a supply of unpasted starch slurry.

8. The pasting means called for in claim 7 wherein there are a plurality of said jet pasting units located in substantially uniformly spaced apart positions within said tank.

OLIVER R. ETHERIDGE.

REFERENCES CITED

The following references are of record in the file of this patent:

UNITED STATES PATENTS

| Number | Name | Date |
| --- | --- | --- |
| 140,017 | Cram | June 17, 1873 |
| 1,418,320 | Miller | June 6, 1922 |
| 1,835,603 | Kinkaid | Dec. 8, 1931 |
| 2,195,335 | Loginov | Mar. 26, 1940 |
| 2,202,573 | Coppock | May 28, 1940 |
| 2,313,574 | Payne | Mar. 9, 1943 |

FOREIGN PATENTS

| Number | Country | Date |
| --- | --- | --- |
| 571,863 | France | Feb. 9, 1924 |
| 24,704 | Sweden | Dec. 15, 1906 |
| 408,528 | Germany | Jan. 20, 1925 |